(12) United States Patent
Whiting et al.

(10) Patent No.: US 12,436,918 B1
(45) Date of Patent: Oct. 7, 2025

(54) SYSTEM FOR DATA AGGREGATION FROM AT LEAST ONE SOURCE FOR USE IN DATA ANALYSIS

(71) Applicant: DATRAKS, LLC, Orlando, FL (US)

(72) Inventors: Correll Whiting, Longwood, FL (US);
Kevin Davidson, Longwood, FL (US);
Joseph Sleiman, Windermere, FL (US);
Brooks Robinson, Maitland, FL (US);
Eric Sexton, Maitland, FL (US);
William Stern, Westfield, NJ (US)

(73) Assignee: DATRAKS, LLC, Orlando, FL (US)

( * ) Notice: Subject to any disclaimer, the term of this patent is extended or adjusted under 35 U.S.C. 154(b) by 325 days.

(21) Appl. No.: 17/676,467

(22) Filed: Feb. 21, 2022

(51) Int. Cl.
*G06F 16/16* (2019.01)
*G06F 16/2455* (2019.01)
*G06F 16/25* (2019.01)
*G06F 16/26* (2019.01)

(52) U.S. Cl.
CPC ...... *G06F 16/168* (2019.01); *G06F 16/24556* (2019.01); *G06F 16/258* (2019.01); *G06F 16/26* (2019.01)

(58) Field of Classification Search
CPC ............. G06F 16/168; G06F 16/24556; G06F 16/258; G06F 16/26
See application file for complete search history.

(56) References Cited

U.S. PATENT DOCUMENTS

| 10,994,187 | B2* | 5/2021 | Cherryhomes | .... G09B 19/0038 |
| 2002/0015060 | A1* | 2/2002 | Honjas | .... G06Q 30/02 715/748 |
| 2005/0227793 | A1* | 10/2005 | Kerns | .... A63B 71/0672 473/451 |
| 2008/0086223 | A1* | 4/2008 | Pagliarulo | .... A63B 24/0021 235/375 |
| 2009/0172076 | A1* | 7/2009 | Dunbar | .... G06Q 10/10 709/202 |
| 2018/0137364 | A1* | 5/2018 | Forouhar | .... G06V 20/44 |
| 2021/0124723 | A1* | 4/2021 | Barthel | .... G06F 16/9538 |

* cited by examiner

*Primary Examiner* — Miranda Le
(74) *Attorney, Agent, or Firm* — ALBERT BORDAS, P.A.

(57) ABSTRACT

A system for data aggregation from at least one source for use in data analysis having a graphical user interface that shows multiple data sources for users to analyze data. A database stores and visualizes data from data files captured on a web application, whereby users analyze the data through visual tools, charts, and graphs. The system also automatically transforms the data into evaluation templates. The evaluation templates may be an automated computer readable format. The reports can be customized by users or selected from existing templates. Users have the ability to design their own reports.

2 Claims, 14 Drawing Sheets
(2 of 14 Drawing Sheet(s) Filed in Color)

| PitchNo | Date | Time | PAofInning | PitchofPA | Pitcher | PitcherId | PitcherThrows | PitcherTeam | Batter |
|---|---|---|---|---|---|---|---|---|---|
| 268 | 1/24/20 | 5:15:59 PM | 7 | 1 | Player H | 1000055297 | Right | Team B | Player M |
| 269 | 1/24/20 | 5:16:17 PM | 7 | 2 | Player H | 1000055297 | Right | Team B | Player M |
| 270 | 1/24/20 | 5:16:38 PM | 7 | 3 | Player H | 1000055297 | Right | Team B | Player M |
| 271 | 1/24/20 | 5:17:00 PM | 7 | 4 | Player H | 1000055297 | Right | Team B | Player M |
| 272 | 1/24/20 | 5:17:18 PM | 7 | 5 | Player H | 1000055297 | Right | Team B | Player M |
| 273 | 1/24/20 | 5:17:44 PM | 7 | 6 | Player H | 1000055297 | Right | Team B | Player M |
| 274 | 1/24/20 | 5:18:19 PM | 8 | 1 | Player H | 1000055297 | Right | Team B | Player O |
| 275 | 1/24/20 | 5:18:43 PM | 8 | 2 | Player H | 1000055297 | Right | Team B | Player O |
| 276 | 1/24/20 | 5:19:25 PM | 9 | 1 | Player H | 1000055297 | Right | Team B | Player P |
| 277 | 1/24/20 | 5:19:47 PM | 9 | 2 | Player H | 1000055297 | Right | Team B | Player P |
| 278 | 1/24/20 | 5:20:09 PM | 9 | 3 | Player H | 1000055297 | Right | Team B | Player P |
| 279 | 1/24/20 | 5:20:33 PM | 9 | 4 | Player H | 1000055297 | Right | Team B | Player P |
| 299 | 1/24/20 | 5:35:32 PM | 8 | 1 | Player H | 1000055297 | Right | Team A | Player T |
| 300 | 1/24/20 | 5:35:57 PM | 8 | 2 | Player H | 1000055297 | Right | Team A | Player T |
| 301 | 1/24/20 | 5:36:17 PM | 8 | 3 | Player H | 1000055297 | Right | Team A | Player T |
| 302 | 1/24/20 | 5:36:41 PM | 8 | 4 | Player H | 1000055297 | Right | Team A | Player T |
| 303 | 1/24/20 | 5:37:05 PM | 8 | 5 | Player H | 1000055297 | Right | Team A | Player T |
| 304 | 1/24/20 | 5:37:44 PM | 9 | 1 | Player H | 1000055297 | Right | Team A | Player R |
| 305 | 1/24/20 | 5:38:05 PM | 9 | 2 | Player H | 1000055297 | Right | Team A | Player R |
| 306 | 1/24/20 | 5:38:27 PM | 9 | 3 | Player H | 1000055297 | Right | Team A | Player R |
| 307 | 1/24/20 | 5:39:12 PM | 10 | 1 | Player H | 1000055297 | Right | Team A | Player D |
| 308 | 1/24/20 | 5:39:35 PM | 10 | 2 | Player H | 1000055297 | Right | Team A | Player D |
| 309 | 1/24/20 | 5:40:07 PM | 10 | 3 | Player H | 1000055297 | Right | Team A | Player D |
| 310 | 1/24/20 | 5:40:39 PM | 10 | 4 | Player H | 1000055297 | Right | Team A | Player D |
| 311 | 1/24/20 | 5:41:05 PM | 10 | 5 | Player H | 1000055297 | Right | Team A | Player D |
| 312 | 1/24/20 | 5:41:41 PM | 10 | 6 | Player H | 1000055297 | Right | Team A | Player D |
| 313 | 1/24/20 | 5:42:06 PM | 10 | 7 | Player H | 1000055297 | Right | Team A | Player D |
| 314 | 1/24/20 | 5:42:39 PM | 10 | 8 | Player H | 1000055297 | Right | Team A | Player D |
| 315 | 1/24/20 | 5:43:19 PM | 11 | 1 | Player H | 1000055297 | Right | Team A | Player N |
| 316 | 1/24/20 | 5:43:44 PM | 11 | 2 | Player H | 1000055297 | Right | Team A | Player N |

Fig. 3

| BatterId | BatterSide | BatterTeam | PitcherSet | Inning | Top/Bottom | Outs | Balls | Strikes | TaggedPitchType |
|---|---|---|---|---|---|---|---|---|---|
| 1000023914 | Left | Team A | Stretch | 8 | Bottom | 0 | 0 | 0 | Fastball |
| 1000023914 | Left | Team A | Stretch | 8 | Bottom | 0 | 1 | 0 | Fastball |
| 1000023914 | Left | Team A | Stretch | 8 | Bottom | 0 | 2 | 0 | Fastball |
| 1000023914 | Left | Team A | Stretch | 8 | Bottom | 0 | 3 | 0 | Fastball |
| 1000023914 | Left | Team A | Stretch | 8 | Bottom | 0 | 3 | 1 | Fastball |
| 1000023914 | Left | Team A | Stretch | 8 | Bottom | 0 | 3 | 2 | Fastball |
| 1000038923 | Right | Team A | Stretch | 8 | Bottom | 1 | 0 | 0 | Fastball |
| 1000038923 | Right | Team A | Stretch | 8 | Bottom | 1 | 1 | 0 | Fastball |
| 1000047555 | Right | Team A | Stretch | 8 | Bottom | 2 | 0 | 0 | Slider |
| 1000047555 | Right | Team A | Stretch | 8 | Bottom | 2 | 1 | 0 | Slider |
| 1000047555 | Right | Team A | Stretch | 8 | Bottom | 2 | 2 | 0 | Fastball |
| 1000047555 | Right | Team A | Stretch | 8 | Bottom | 2 | 3 | 0 | Fastball |
| 8900861 | Right | Team B | Stretch | 9 | Top | 0 | 0 | 0 | Fastball |
| 8900861 | Right | Team B | Stretch | 9 | Top | 0 | 0 | 1 | Slider |
| 8900861 | Right | Team B | Stretch | 9 | Top | 0 | 1 | 1 | Fastball |
| 8900861 | Right | Team B | Stretch | 9 | Top | 0 | 2 | 1 | Fastball |
| 8900861 | Right | Team B | Stretch | 9 | Top | 0 | 3 | 1 | Fastball |
| 8900350 | Left | Team B | Stretch | 9 | Top | 1 | 0 | 0 | Fastball |
| 8900350 | Left | Team B | Stretch | 9 | Top | 1 | 0 | 1 | Slider |
| 8900350 | Left | Team B | Stretch | 9 | Top | 1 | 1 | 1 | Fastball |
| 8891060 | Left | Team B | Stretch | 9 | Top | 1 | 0 | 0 | Fastball |
| 8891060 | Left | Team B | Stretch | 9 | Top | 1 | 0 | 1 | Fastball |
| 8891060 | Left | Team B | Stretch | 9 | Top | 1 | 0 | 2 | Fastball |
| 8891060 | Left | Team B | Stretch | 9 | Top | 1 | 0 | 2 | Fastball |
| 8891060 | Left | Team B | Stretch | 9 | Top | 1 | 1 | 2 | Fastball |
| 8891060 | Left | Team B | Stretch | 9 | Top | 2 | 2 | 2 | Slider |
| 8891060 | Left | Team B | Stretch | 9 | Top | 2 | 3 | 2 | Fastball |
| 8891060 | Left | Team B | Stretch | 9 | Top | 2 | 3 | 2 | Fastball |
| 8900819 | Right | Team B | Stretch | 9 | Top | 2 | 0 | 0 | Fastball |
| 8900819 | Right | Team B | Stretch | 9 | Top | 2 | 1 | 0 | Fastball |

Fig. 3. Continuation

| AutoPitchType | PitchCall | KorBB | HitType | PlayResult | OutsOnPlay | RunsScored | Notes | RelSpeed |
|---|---|---|---|---|---|---|---|---|
| Fastball | BallCalled | Undefined | Undefined | Undefined | 0 | 0 | | 91.00917005 |
| Fastball | BallCalled | Undefined | Undefined | Undefined | 0 | 0 | | 91.44605309 |
| Fastball | BallCalled | Undefined | Undefined | Undefined | 0 | 0 | | 92.60676463 |
| Fastball | StrikeCalled | Undefined | Undefined | Undefined | 0 | 0 | | 88.92313256 |
| Fastball | FoulBall | Undefined | Undefined | Undefined | 0 | 0 | | 91.35718597 |
| Fastball | InPlay | Undefined | GroundBall | Out | 1 | 0 | | 90.75973334 |
| Fastball | BallCalled | Undefined | Undefined | Undefined | 0 | 0 | | 91.39027678 |
| Fastball | InPlay | Undefined | FlyBall | Out | 1 | 0 | | 91.09137627 |
| Slider | BallCalled | Undefined | Undefined | Undefined | 0 | 0 | | 79.85502385 |
| Slider | BallCalled | Undefined | Undefined | Undefined | 0 | 0 | | 81.25361479 |
| Fastball | BallCalled | Undefined | Undefined | Undefined | 0 | 0 | | 90.98561386 |
| Fastball | InPlay | Undefined | FlyBall | Out | 1 | 0 | | 91.71985757 |
| Fastball | FoulBall | Undefined | Undefined | Undefined | 0 | 0 | | 89.11409293 |
| Curveball | BallCalled | Undefined | Undefined | Undefined | 0 | 0 | | 77.75615627 |
| Fastball | BallCalled | Undefined | Undefined | Undefined | 0 | 0 | | 89.75272203 |
| Fastball | BallCalled | Undefined | Undefined | Undefined | 0 | 0 | | 87.56781674 |
| Fastball | InPlay | Undefined | FlyBall | Out | 1 | 0 | | 88.77696372 |
| Fastball | StrikeCalled | Undefined | Undefined | Undefined | 0 | 0 | | 90.11195558 |
| Slider | BallCalled | Undefined | Undefined | Undefined | 0 | 0 | | 80.91570279 |
| Fastball | InPlay | Undefined | GroundBall | Single | 0 | 0 | | 89.91867982 |
| Fastball | StrikeCalled | Undefined | Undefined | Undefined | 0 | 0 | | 90.27069989 |
| Fastball | StrikeCalled | Undefined | Undefined | Undefined | 0 | 0 | | 89.90257266 |
| Fastball | FoulBall | Undefined | Undefined | Undefined | 0 | 0 | | 90.85069874 |
| Fastball | BallCalled | Undefined | Undefined | Undefined | 0 | 0 | | 89.50839154 |
| Fastball | BallCalled | Undefined | Undefined | Undefined | 1 | 0 | | 88.21033441 |
| Curveball | BallCalled | Undefined | Undefined | Undefined | 0 | 0 | | 77.79184948 |
| Fastball | FoulBall | Undefined | Undefined | Undefined | 0 | 0 | | 90.3050368 |
| Fastball | BallCalled | Walk | Undefined | Undefined | 0 | 0 | | 90.26242135 |
| Fastball | BallCalled | Undefined | Undefined | Undefined | 0 | 0 | | 87.43211816 |
| Fastball | InPlay | Undefined | Popup | Out | 1 | 0 | | 87.82728586 |

Fig. 3. Continuation

| VertRelAngle | HorzRelAngle | SpinRate | SpinAxis | Tilt | RelHeight | RelSide |
|---|---|---|---|---|---|---|
| -2.93315813 | -2.662783134 | 2490.489101 | 212.7796584 | 1:00 | 5.138807442 | 1.841914906 |
| -2.685152131 | -3.063073063 | 2500.992284 | 208.0897977 | 1:00 | 5.071449157 | 1.954090298 |
| -3.714972467 | -3.898001184 | 2537.48328 | 210.4250244 | 1:00 | 5.25867437 | 1.789646034 |
| -0.302975941 | -2.111307438 | 2439.040208 | 214.9017101 | 1:15 | 4.946525268 | 1.90151338 |
| -2.215368478 | -1.593495012 | 2512.680534 | 193.6995397 | 12:30 | 5.201721801 | 1.902429733 |
| -0.963339414 | -2.958870268 | 2491.586437 | 203.0851089 | 12:45 | 4.857302692 | 1.920961189 |
| -4.102863514 | -3.330747829 | 2401.082241 | 205.7833477 | 12:45 | 5.173160027 | 1.868757665 |
| -2.044223975 | -3.281495835 | 2591.319941 | 205.9773354 | 12:45 | 5.303256208 | 1.910921001 |
| 2.108469908 | -0.062946431 | 2480.664901 | 106.5964544 | 9:30 | 5.150752488 | 1.97116034 |
| -0.959397526 | -2.88607313 | 2643.445725 | 100.4792169 | 9:15 | 5.027052927 | 1.863912601 |
| -4.111698899 | -4.153605702 | 2498.183411 | 214.6084484 | 1:15 | 5.209850052 | 1.761382635 |
| -2.481737019 | -2.833290637 | 2521.515192 | 212.4361884 | 1:00 | 5.265606029 | 1.933013639 |
| -1.293843282 | -2.909863045 | 2332.792355 | 222.0132567 | 1:30 | 5.165919661 | 2.011825524 |
| 0.701939038 | -0.045717685 | 2536.50178 | 73.08262376 | 8:30 | 4.92850338 | 1.953010047 |
| -1.536409892 | -3.942182793 | 2584.130879 | 196.1148877 | 12:30 | 5.293576643 | 1.84199823 |
| -2.8686641 | -3.726260128 | 2340.344044 | 206.8356803 | 1:00 | 4.893968394 | 1.908853341 |
| -2.265209676 | -2.547986383 | 2419.386875 | 204.1706112 | 12:45 | 5.330205296 | 1.656295369 |
| -0.960572724 | -2.644905696 | 2475.338327 | 228.1142758 | 1:30 | 4.934918548 | 1.948255875 |
| -0.080992919 | -1.06120444 |  | 69.46427979 | 8:15 | 4.928474991 | 1.982256249 |
| -1.520691362 | -2.71789126 | 2502.729212 | 214.6964145 | 1:15 | 5.061507311 | 1.758973493 |
| -2.045278149 | -2.259128882 | 2460.692211 | 210.5492776 | 1:00 | 5.248266402 | 1.992722865 |
| -2.1447835 | -1.367857523 | 2469.152823 | 207.4372873 | 1:00 | 5.050626637 | 2.003128916 |
| -1.515465803 | -1.797175966 | 2561.728109 | 212.3991292 | 1:00 | 5.15871074 | 1.920459275 |
| -2.840574488 | -2.401452808 | 2428.855113 | 217.1565501 | 1:15 | 5.081301776 | 1.917126151 |
| -2.683948161 | -1.448323269 | 2405.69489 | 204.7978391 | 12:45 | 5.184160697 | 1.916174136 |
| 2.508025096 | 1.090246581 | 2336.038447 | 62.40821533 | 8:00 | 5.163213847 | 1.915439152 |
| -2.202309603 | -2.496259426 | 2580.221548 | 204.6660721 | 12:45 | 5.267005458 | 1.867245069 |
| -0.024970368 | -2.11040324 | 2426.884268 | 199.3631528 | 12:45 | 5.403946705 | 1.758995283 |
| -0.019320395 | -0.289331073 | 2345.769224 | 192.5668672 | 12:30 | 5.144590093 | 1.783786022 |
| -0.70519562 | -2.762187484 | 2377.792014 | 224.9175282 | 1:30 | 5.154217601 | 1.726684673 |

Fig. 3. Continuation

| Extension | VertBreak | InducedVertBreak | HorzBreak | PlateLocHeight | PlateLocSide | ZoneSpeed |
|---|---|---|---|---|---|---|
| 6.64716603 | -16.15021108 | 16.56146061 | 10.68461879 | 1.103247329 | 0.293536368 | 83.37730668 |
| 6.79417969 | -16.90100702 | 15.54388872 | 8.312388491 | 1.20713758 | -0.151374454 | 83.18616223 |
| 6.657399253 | -15.21186754 | 16.7063108 | 9.828969573 | 0.579035271 | -0.963582185 | 84.23271227 |
| 6.753481936 | -19.24248703 | 14.98619765 | 10.47763361 | 3.066069511 | 0.845402902 | 80.80478387 |
| 6.734663122 | -12.70012794 | 19.88538987 | 4.854834689 | 2.117439389 | 0.850673684 | 82.77726668 |
| 6.844507134 | -19.66273352 | 13.14780763 | 5.617125716 | 2.339145681 | -0.311144193 | 82.49256384 |
| 6.695841273 | -19.20219997 | 13.44308487 | 6.508648682 | -0.191306135 | -0.637796389 | 83.53680138 |
| 6.665669271 | -9.896777324 | 23.13538722 | 11.28768835 | 2.604422614 | -0.153925289 | 82.12787899 |
| 5.972090981 | -41.59711022 | 2.441642635 | -8.331105059 | 3.639747212 | 1.218550668 | 72.23180131 |
| 6.131835273 | -41.25199593 | 1.312531603 | -7.312518602 | 0.701497715 | -1.415044893 | 73.69773424 |
| 6.673995881 | -17.67425908 | 15.32318344 | 10.59550072 | -0.04054165 | -1.16180793 | 83.11339933 |
| 6.90422279 | -16.68031787 | 15.50157987 | 9.870570583 | 1.611219239 | 0.173109724 | 83.17093894 |
| 6.712389879 | -20.08733047 | 14.14944995 | 12.77514886 | 2.307581133 | 0.414307261 | 80.93442931 |
| 6.240033753 | -49.10327366 | -3.307775447 | -10.73374593 | 1.484006348 | 1.016365042 | 71.04215745 |
| 6.856274693 | -13.38618431 | 20.36542142 | 5.893078376 | 2.773871901 | -1.266132979 | 81.12638442 |
| 7.018688135 | -19.35468011 | 15.68421548 | 7.951597758 | 0.666540277 | -0.819446053 | 79.96126508 |
| 6.705037139 | -16.31768232 | 18.18281621 | 8.175032246 | 1.896412533 | 0.006640865 | 80.70534608 |
| 6.864077395 | -21.78126953 | 11.17201313 | 12.49220407 | 2.24330726 | 0.576926666 | 82.68082406 |
| 6.052619422 | -45.08128593 | -2.787733967 | -7.335830434 | 1.096722234 | 0.388587324 | 74.48990002 |
| 6.917047682 | -19.26473799 | 13.73817513 | 9.532975014 | 2.069637838 | 0.076889693 | 82.61312138 |
| 6.627711874 | -15.74722213 | 17.70907294 | 10.47053277 | 2.061190382 | 0.795849111 | 82.00358389 |
| 6.791649795 | -16.88997454 | 16.40567315 | 8.533696092 | 1.684135746 | 1.465604753 | 82.2504077 |
| 6.725144706 | -19.24627367 | 13.38383216 | 8.512822036 | 2.168942084 | 0.986973828 | 83.23210516 |
| 6.868769619 | -20.51126473 | 12.94908346 | 9.837262723 | 0.778892103 | 0.547068799 | 82.27966816 |
| 6.746279331 | -17.76122238 | 16.79226851 | 7.773358926 | 1.249745059 | 1.24065685 | 81.06217183 |
| 6.021029746 | -50.5223455 | -4.728702719 | -8.965945921 | 3.277702982 | 2.178118403 | 71.39786534 |
| 6.711670939 | -17.91688515 | 15.19835742 | 6.993861163 | 1.757929098 | 0.166829408 | 82.69390551 |
| 6.433030196 | -19.05287035 | 14.3906338 | 5.068392703 | 3.793245465 | 0.241133169 | 82.48004558 |
| 6.779941893 | -18.81187443 | 16.50429033 | 3.686528427 | 3.559296209 | 1.82686612 | 79.4866295 |
| 6.865792014 | -22.37051086 | 12.47459512 | 12.47140278 | 2.646516653 | 0.246572836 | 80.19074936 |

Fig. 3. Continuation

| VertApprAngle | HorzApprAngle | ZoneTime | ExitSpeed | Angle | Direction | HitSpinRate |
|---|---|---|---|---|---|---|
| -5.997290144 | -0.626519699 | 0.411645041 | | | | |
| -5.912943009 | -1.469683914 | 0.409963045 | | | | |
| -6.608062995 | -2.0210919 | 0.406621714 | | | | |
| -3.987784895 | -0.102463131 | 0.421081948 | | | | |
| -4.646369123 | -0.661313993 | 0.410850511 | | | | |
| -4.730642046 | -1.881191538 | 0.41226666 | 94.01242614 | 1.837126189 | 32.01997923 | 3521.777646 |
| -7.739563258 | -2.08782147 | 0.411227121 | | | | |
| -3.943045135 | -1.11611505 | 0.413656673 | 100.6346303 | 35.19286329 | -3.055002546 | 3899.235257 |
| -5.762095137 | -1.643393027 | 0.47762717 | | | | |
| -8.742097043 | -4.276421907 | 0.469564685 | | | | |
| -7.461754781 | -2.133752124 | 0.413439207 | | | | |
| -5.681217911 | -0.933437009 | 0.408298086 | 89.53609432 | 31.37198921 | -3.291518619 | 2136.639363 |
| -5.134530796 | -0.462081736 | 0.421131742 | | | | |
| -8.577908807 | -2.088723158 | 0.487060502 | | | | |
| -4.107441697 | -2.810778833 | 0.418137134 | | | | |
| -6.569663563 | -2.199532706 | 0.426036416 | | | | |
| -5.380162105 | -0.982371701 | 0.422750572 | 97.59430896 | 44.27788862 | -3.649898443 | 4557.914476 |
| -5.116070166 | -0.256269818 | 0.413162465 | | | | |
| -8.529925685 | -2.446306417 | 0.46806762 | | | | |
| -5.195468445 | -0.895069894 | 0.413473477 | 105.9009129 | 1.399433676 | -3.73309909 | 1531.657223 |
| -5.049618791 | -0.255556003 | 0.416303863 | | | | |
| -5.36413856 | 0.265626805 | 0.415303176 | | | | |
| -5.179389168 | -0.171390026 | 0.411131506 | | | | |
| -6.739705639 | -0.520001411 | 0.41632908 | | | | |
| -6.054964686 | 0.035398232 | 0.423075117 | | | | |
| -6.985389921 | -0.6009608 | 0.487050636 | | | | |
| -5.609423016 | -1.161479595 | 0.414176533 | | | | |
| -3.640848428 | -1.147822675 | 0.416224276 | | | | |
| -3.624328126 | 0.418093516 | 0.427718747 | | | | |
| -4.984780933 | -0.371871076 | 0.424856643 | 91.53963922 | 60.51035068 | 5.31703224 | 5383.361579 |

Fig. 3. Continuation

| PositionAt110X | PositionAt110Y | PositionAt110Z | Distance | LastTrackedDistance | Bearing | HangTime |
|---|---|---|---|---|---|---|
| | | | 56.75851962 | 55.88656317 | 33.08856628 | 0.432069702 |
| 109.9679242 | 74.51979121 | -2.655787826 | 376.5003075 | 152.8783281 | 3.595464095 | 5.769613647 |
| 109.9260881 | 57.98625872 | -4.030664106 | 334.0474373 | 329.4143181 | -0.041556954 | 4.778189087 |
| 109.9689257 | 102.636783 | -2.610242812 | 322.6107671 | 98.0932847 | 2.595279726 | 6.17635437 |
| | | | 54.2397045 | 50.53566011 | -4.96881267 | 0.358862915 |
| 108.0714082 | 161.1962955 | 20.5076875 | 189.55244 | 74.93324961 | 12.17644686 | 6.405640259 |

Fig. 3. Continuation

| pfxx | pfxz | x0 | y0 | z0 | vx0 | vy0 | vz0 |
|---|---|---|---|---|---|---|---|
| -6.656293638 | 9.98867103 | -1.667085848 | 50 | 4.934408315 | 5.850033293 | -132.34659 | -7.249707023 |
| -5.555329672 | 9.47957935 | -1.758888436 | 50 | 4.890852434 | 6.884530013 | -132.936966 | -6.709463144 |
| -6.61960517 | 10.3866343 | -1.531743361 | 50 | 5.002260952 | 8.87122663 | -134.3419243 | -9.180316093 |
| -6.467083196 | 8.441495678 | -1.767436335 | 50 | 4.919164919 | 4.490042489 | -129.5009662 | -1.207084268 |
| -3.196539716 | 11.76569348 | -1.799550526 | 50 | 5.050945285 | 3.563336042 | -132.9561825 | -5.499464706 |
| -4.028182684 | 7.641368961 | -1.734034516 | 50 | 4.788383839 | 6.675312696 | -132.0874854 | -2.756177088 |
| -4.586882271 | 8.668485469 | -1.649897608 | 50 | 4.891969018 | 7.535028162 | -132.6248824 | -10.07076229 |
| -7.321020842 | 13.52055501 | -1.695572939 | 50 | 5.162096438 | 7.272536363 | -132.3787424 | -5.011190819 |
| 4.500704982 | 0.656206757 | -1.961589157 | 50 | 5.294567434 | 0.36404833 | -116.091112 | 3.093173517 |
| 3.028799239 | 1.039252611 | -1.639860739 | 50 | 4.93258907 | 6.153936701 | -118.0251873 | -3.128679938 |
| -7.080071257 | 9.696008917 | -1.48774262 | 50 | 4.926769932 | 9.281048774 | -131.9151784 | -10.00628743 |
| -6.410302766 | 9.460580767 | -1.75854647 | 50 | 5.103475433 | 6.336008433 | -133.3850279 | -6.236520053 |
| -7.988267615 | 8.266093254 | -1.824315685 | 50 | 5.072219361 | 6.240423187 | -129.6497656 | -3.48190763 |
| 5.862772291 | -2.028123372 | -1.944304317 | 50 | 4.956443971 | 0.373182009 | -113.1810169 | 0.092622403 |
| -4.533918842 | 11.88635219 | -1.592972776 | 50 | 5.190620893 | 8.831793846 | -130.4297648 | -3.86213813 |
| -5.556139394 | 9.656670834 | -1.684743398 | 50 | 4.712457738 | 8.088791686 | -127.2589479 | -6.875372957 |
| -5.311091211 | 10.79496874 | -1.490624315 | 50 | 5.173348706 | 5.523059762 | -129.1338493 | -5.559002406 |
| -7.692852475 | 6.498791052 | -1.784880085 | 50 | 4.865745391 | 5.726255382 | -131.2541483 | -2.790721165 |
| 3.679073807 | -1.489949724 | -1.895894924 | 50 | 4.897902929 | 2.391989136 | -117.7947692 | -1.457082262 |
| -6.058192345 | 8.090202994 | -1.59227365 | 50 | 4.959245429 | 5.963119821 | -130.9576685 | -3.993121297 |
| -6.487738035 | 10.44018415 | -1.844252932 | 50 | 5.103272939 | 4.885060968 | -131.3337808 | -5.139034882 |
| -5.141703563 | 9.748421965 | -1.917833806 | 50 | 4.905136311 | 2.893584052 | -130.9366217 | -5.366147571 |
| -5.228494965 | 7.85787735 | -1.805364891 | 50 | 5.051072894 | 3.913474438 | -132.3355524 | -4.042709838 |
| -6.147205432 | 8.005425368 | -1.768433661 | 50 | 4.893266144 | 5.199630284 | -130.2567586 | -7.017248697 |
| -4.712458522 | 10.06048884 | -1.824304249 | 50 | 5.001037903 | 3.036302109 | -128.4364586 | -6.504899662 |
| 5.159778113 | -3.257652222 | -1.995803017 | 50 | 5.331871959 | -1.904819847 | -113.1521913 | 3.556581245 |
| -4.580455027 | 9.057278885 | -1.704832169 | 50 | 5.113928134 | 5.534081394 | -131.4225728 | -5.55931468 |
| -3.374042835 | 7.920993084 | -1.611391127 | 50 | 5.393448058 | 4.692985488 | -131.4357449 | -0.622853856 |
| -2.142230909 | 9.211615552 | -1.766416046 | 50 | 5.136071689 | 0.545682307 | -127.4229326 | -0.541931442 |
| -7.761898126 | 7.17555855 | -1.555898038 | 50 | 5.101117252 | 5.843748177 | -127.8875154 | -2.161419049 |

Fig. 3. Continuation

| ax0 | ay0 | az0 | HomeTeam | AwayTeam | Stadium | Level | League |
|---|---|---|---|---|---|---|---|
| -11.81406884 | 28.06095713 | -14.44543657 | Team A | Team B | PhoenixMunicipal | D1 | PAC12 |
| -9.870015674 | 30.40490763 | -15.33191635 | Team A | Team B | PhoenixMunicipal | D1 | PAC12 |
| -12.0158227 | 30.93804155 | -13.32036274 | Team A | Team B | PhoenixMunicipal | D1 | PAC12 |
| -10.90837894 | 28.74422946 | -17.93532132 | Team A | Team B | PhoenixMunicipal | D1 | PAC12 |
| -5.662866421 | 31.24980751 | -11.33039997 | Team A | Team B | PhoenixMunicipal | D1 | PAC12 |
| -7.063572148 | 30.09235508 | -18.7746163 | Team A | Team B | PhoenixMunicipal | D1 | PAC12 |
| -8.133603231 | 29.53545799 | -16.80281876 | Team A | Team B | PhoenixMunicipal | D1 | PAC12 |
| -12.81719521 | 31.79072462 | -8.503088366 | Team A | Team B | PhoenixMunicipal | D1 | PAC12 |
| 6.059713732 | 24.45421168 | -31.29053695 | Team A | Team B | PhoenixMunicipal | D1 | PAC12 |
| 4.188918327 | 26.55074191 | -30.73673166 | Team A | Team B | PhoenixMunicipal | D1 | PAC12 |
| -12.43347349 | 28.94968079 | -15.14666769 | Team A | Team B | PhoenixMunicipal | D1 | PAC12 |
| -11.42734172 | 31.50454154 | -15.30912139 | Team A | Team B | PhoenixMunicipal | D1 | PAC12 |
| -13.48706978 | 29.14812561 | -18.21790914 | Team A | Team B | PhoenixMunicipal | D1 | PAC12 |
| 7.522952335 | 22.7335019 | -34.77648213 | Team A | Team B | PhoenixMunicipal | D1 | PAC12 |
| -7.717581604 | 30.4725027 | -11.94124418 | Team A | Team B | PhoenixMunicipal | D1 | PAC12 |
| -9.071687342 | 27.18101175 | -16.40729176 | Team A | Team B | PhoenixMunicipal | D1 | PAC12 |
| -8.90238024 | 28.73274361 | -14.07966596 | Team A | Team B | PhoenixMunicipal | D1 | PAC12 |
| -13.45174219 | 27.16599409 | -20.81024533 | Team A | Team B | PhoenixMunicipal | D1 | PAC12 |
| 5.156715416 | 22.88341143 | -34.26241294 | Team A | Team B | PhoenixMunicipal | D1 | PAC12 |
| -10.56023077 | 26.68271184 | -18.07175439 | Team A | Team B | PhoenixMunicipal | D1 | PAC12 |
| -11.2448443 | 29.80012148 | -14.07864387 | Team A | Team B | PhoenixMunicipal | D1 | PAC12 |
| -8.914493027 | 27.98639785 | -15.27259973 | Team A | Team B | PhoenixMunicipal | D1 | PAC12 |
| -9.276143689 | 28.11944389 | -18.23298141 | Team A | Team B | PhoenixMunicipal | D1 | PAC12 |
| -10.58372402 | 26.8166147 | -18.39100296 | Team A | Team B | PhoenixMunicipal | D1 | PAC12 |
| -7.89328902 | 25.91517471 | -15.32289841 | Team A | Team B | PhoenixMunicipal | D1 | PAC12 |
| 6.691304614 | 20.59523936 | -36.39863784 | Team A | Team B | PhoenixMunicipal | D1 | PAC12 |
| -8.010307872 | 27.87498106 | -16.33466319 | Team A | Team B | PhoenixMunicipal | D1 | PAC12 |
| -5.902359872 | 27.85210501 | -18.31751086 | Team A | Team B | PhoenixMunicipal | D1 | PAC12 |
| -3.498888769 | 27.79397371 | -17.12878987 | Team A | Team B | PhoenixMunicipal | D1 | PAC12 |
| -12.81999781 | 27.0400643 | -20.32248295 | Team A | Team B | PhoenixMunicipal | D1 | PAC12 |

Fig. 3. Continuation

| GameID | PitchUID |
|---|---|
| 20200124-PhoenixMunicipal-1 | db9f17ed-3f07-11ea-97f4-ac1f6b46ffc1 |
| 20200124-PhoenixMunicipal-1 | e48fdcc5-3f07-11ea-97f4-ac1f6b46ffc1 |
| 20200124-PhoenixMunicipal-1 | f426e80a-3f07-11ea-97f4-ac1f6b46ffc1 |
| 20200124-PhoenixMunicipal-1 | ff622b3a-3f07-11ea-97f4-ac1f6b46ffc1 |
| 20200124-PhoenixMunicipal-1 | 0d179d4b-3f08-11ea-97f4-ac1f6b46ffc1 |
| 20200124-PhoenixMunicipal-1 | 1a347a9c-3f08-11ea-97f4-ac1f6b46ffc1 |
| 20200124-PhoenixMunicipal-1 | 2c160416-3f08-11ea-97f4-ac1f6b46ffc1 |
| 20200124-PhoenixMunicipal-1 | 3df78ccf-3f08-11ea-97f4-ac1f6b46ffc1 |
| 20200124-PhoenixMunicipal-1 | 57c5fd5b-3f08-11ea-97f4-ac1f6b46ffc1 |
| 20200124-PhoenixMunicipal-1 | 61baa102-3f08-11ea-97f4-ac1f6b46ffc1 |
| 20200124-PhoenixMunicipal-1 | 7263d781-3f08-11ea-97f4-ac1f6b46ffc1 |
| 20200124-PhoenixMunicipal-1 | 8413501e-3f08-11ea-97f4-ac1f6b46ffc1 |
| 20200124-PhoenixMunicipal-1 | 94ffd47f-3f0a-11ea-97f4-ac1f6b46ffc1 |
| 20200124-PhoenixMunicipal-1 | a6e15daf-3f0a-11ea-97f4-ac1f6b46ffc1 |
| 20200124-PhoenixMunicipal-1 | afd2229e-3f0a-11ea-97f4-ac1f6b46ffc1 |
| 20200124-PhoenixMunicipal-1 | c1781224-3f0a-11ea-97f4-ac1f6b46ffc1 |
| 20200124-PhoenixMunicipal-1 | d0daa98e-3f0a-11ea-97f4-ac1f6b46ffc1 |
| 20200124-PhoenixMunicipal-1 | e576c089-3f0a-11ea-97f4-ac1f6b46ffc1 |
| 20200124-PhoenixMunicipal-1 | f3b1b5df-3f0a-11ea-97f4-ac1f6b46ffc1 |
| 20200124-PhoenixMunicipal-1 | 00490f7d-3f0b-11ea-97f4-ac1f6b46ffc1 |
| 20200124-PhoenixMunicipal-1 | 1b1dc1b1-3f0b-11ea-97f4-ac1f6b46ffc1 |
| 20200124-PhoenixMunicipal-1 | 29755239-3f0b-11ea-97f4-ac1f6b46ffc1 |
| 20200124-PhoenixMunicipal-1 | 3c5858d6-3f0b-11ea-97f4-ac1f6b46ffc1 |
| 20200124-PhoenixMunicipal-1 | 4f0e1317-3f0b-11ea-97f4-ac1f6b46ffc1 |
| 20200124-PhoenixMunicipal-1 | 59b324fe-3f0b-11ea-97f4-ac1f6b46ffc1 |
| 20200124-PhoenixMunicipal-1 | 744e9e34-3f0b-11ea-97f4-ac1f6b46ffc1 |
| 20200124-PhoenixMunicipal-1 | 845cdce5-3f0b-11ea-97f4-ac1f6b46ffc1 |
| 20200124-PhoenixMunicipal-1 | 96b3397b-3f0b-11ea-97f4-ac1f6b46ffc1 |
| 20200124-PhoenixMunicipal-1 | aa2a11df-3f0b-11ea-97f4-ac1f6b46ffc1 |
| 20200124-PhoenixMunicipal-1 | bc0b9abc-3f0b-11ea-97f4-ac1f6b46ffc1 |

Fig. 3. Continuation

SYSTEM FOR DATA AGGREGATION FROM AT LEAST ONE SOURCE FOR USE IN DATA ANALYSIS

II. BACKGROUND OF THE INVENTION

1. Field of the Invention

The present invention relates to data analysis systems, and more particularly, to a system for data aggregation from at least one source for use in data analysis for baseball and softball games.

2. Description of the Related Art

Applicant is not aware of any system for data aggregation from at least one source for use in data analysis having the novel features of the present invention.

III. SUMMARY OF THE INVENTION

The present invention is a system for data aggregation from at least one source for use in data analysis, comprising:
- A) a computer program stored on a non-transitory computer readable medium;
- B) a cloud operatively associated with the non-transitory computer readable medium;
- C) a server operatively associated with the cloud;
- D) a graphical user interface;
- E) data to input to the cloud from data files and through Application Programming Interface connections;
- F) a database to store the data, wherein the computer program allows for data visualization or transforms the data of the database in evaluation templates; and
- G) a computer device whereby users access the graphical user interface to upload the data for the data visualization, connect the Application Programming Interfaces, and/or obtain the evaluation templates automatically.

The users access the graphical user interface and upload the data through an Internet-based communication. The users use at least one computer, tablet computer, smart phone, or means of accessing Internet in order to access the graphical user interface. The data is from at least one data source and is/are collected by devices having optical tracking systems, radar systems, tracking systems, and by an accelerometer. The data files comprise raw data. The users are coaches, players, recruiters, parents, and anyone with a registered account.

The graphical user interface is a dashboard, wherein through the dashboard the users access a team profile, a player profile, and player comparison. The session reports comprise reports from baseball and softball activities in games and practices. The users analyze the data through visual tools, charts, and graphs with the dashboard. The dashboard comprises advanced filters. The evaluation templates comprise reports in a computer readable format, wherein the users generate evaluation templates from the data that has been collected and uploaded to the database. The evaluation templates further provide custom analysis for the users. The data is collected in real time and the evaluation templates are generated post performance. The users get an analysis of the data by categories selected from the group consisting of players, teams, and events. The users get from the database an analysis about the performance of the players. The users get from the database an analysis about batting and pitching performance of the players in games and practices.

The data aggregation from at least one source comprises the steps of:
- H) signing in said dashboard;
- I) uploading said data into said cloud;
- J) providing session information; and
- K) matching said data to a player's profile.

The session information comprises fields selected from the group consisting of device type, date, and event name.

It is therefore one of the main objects of the present invention to provide a system for data aggregation from at least one source for use in data analysis.

It is another object of this invention to provide a system for data aggregation from at least one source for use in data analysis, which allow users accessing to an analysis of the data.

It is another object of this invention to provide a system for data aggregation from at least one source for use in data analysis, which allow allows maximization of player development and leads to the possibility of more games won.

It is another object of this invention to provide a system for data aggregation from at least one source for use in data analysis, which allow users to access and interpret the data collected by multiple technologies in one centralized location.

It is another object of this invention to provide a system for data aggregation from at least one source for use in data analysis, which allow the automation of reports creation.

It is another object of this invention to provide a system for data aggregation from at least one source for use in data analysis, which shows data sources inside an interface that allows users to analyze their data through visual tools, charts, and graphs.

Further objects of the invention will be brought out in the following part of the specification, wherein detailed description is for the purpose of fully disclosing the invention without placing limitations thereon.

IV. BRIEF DESCRIPTION OF THE DRAWINGS

The patent or application file contains at least one drawing executed in color. Copies of this patent or patent application publication with color drawings will be provided by the Office upon request and payment of the necessary fee.

With the above and other related objects in view, the invention consists in the details of construction and combination of parts as will be more fully understood from the following description, when read in conjunction with the accompanying drawings in which:

FIG. 3 is a representation of a sample raw data of the present invention.

V. DETAILED DESCRIPTION OF THE PREFERRED EMBODIMENT

Figure 1:
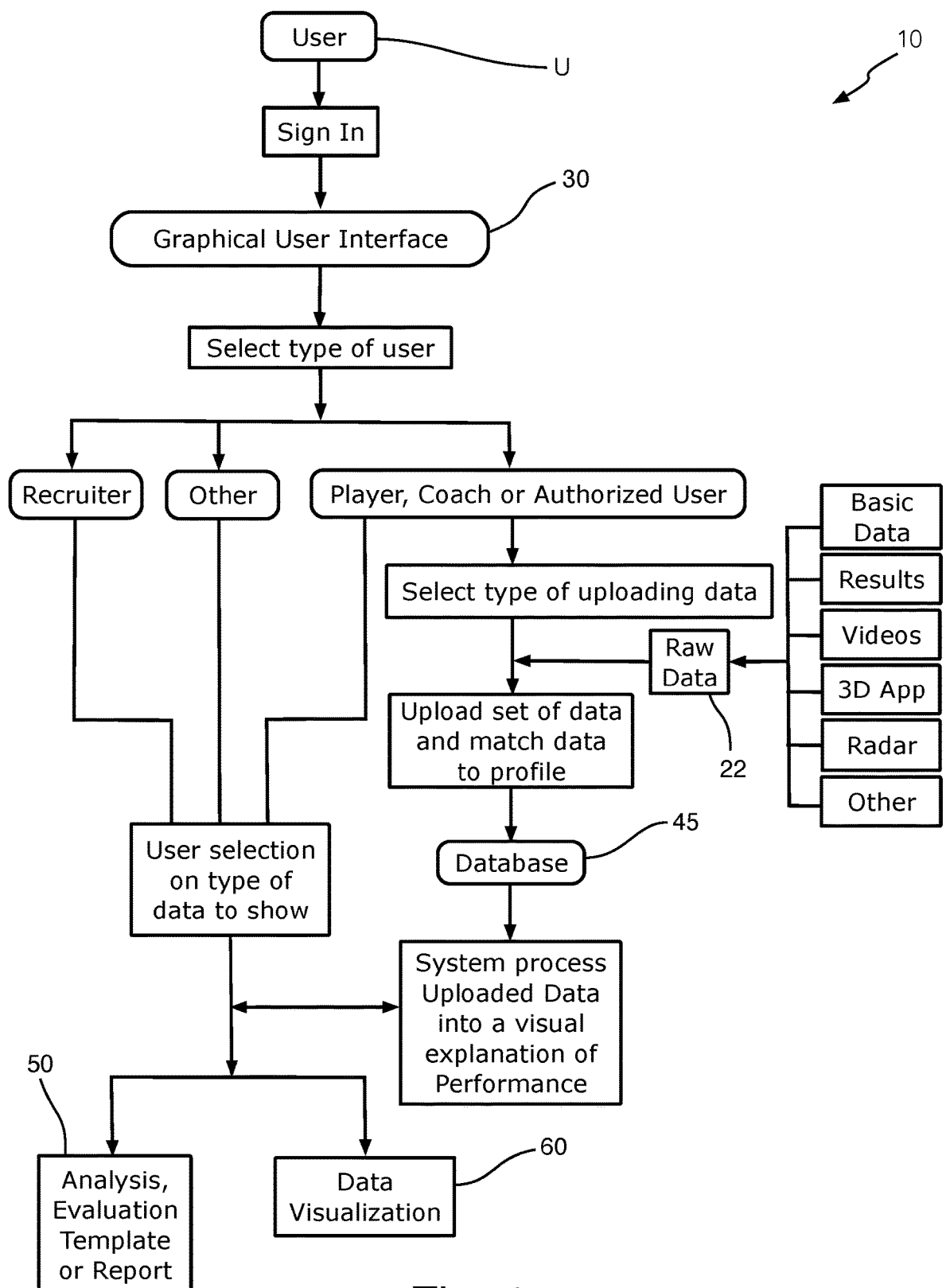
FIG. 1 is a flowchart representing a method for users to interact with a system of the present invention.

Referring now to the drawings, the present invention is a system for data aggregation from at least one source for use in data analysis, and is generally referred to with numeral 10.

Figure 2:
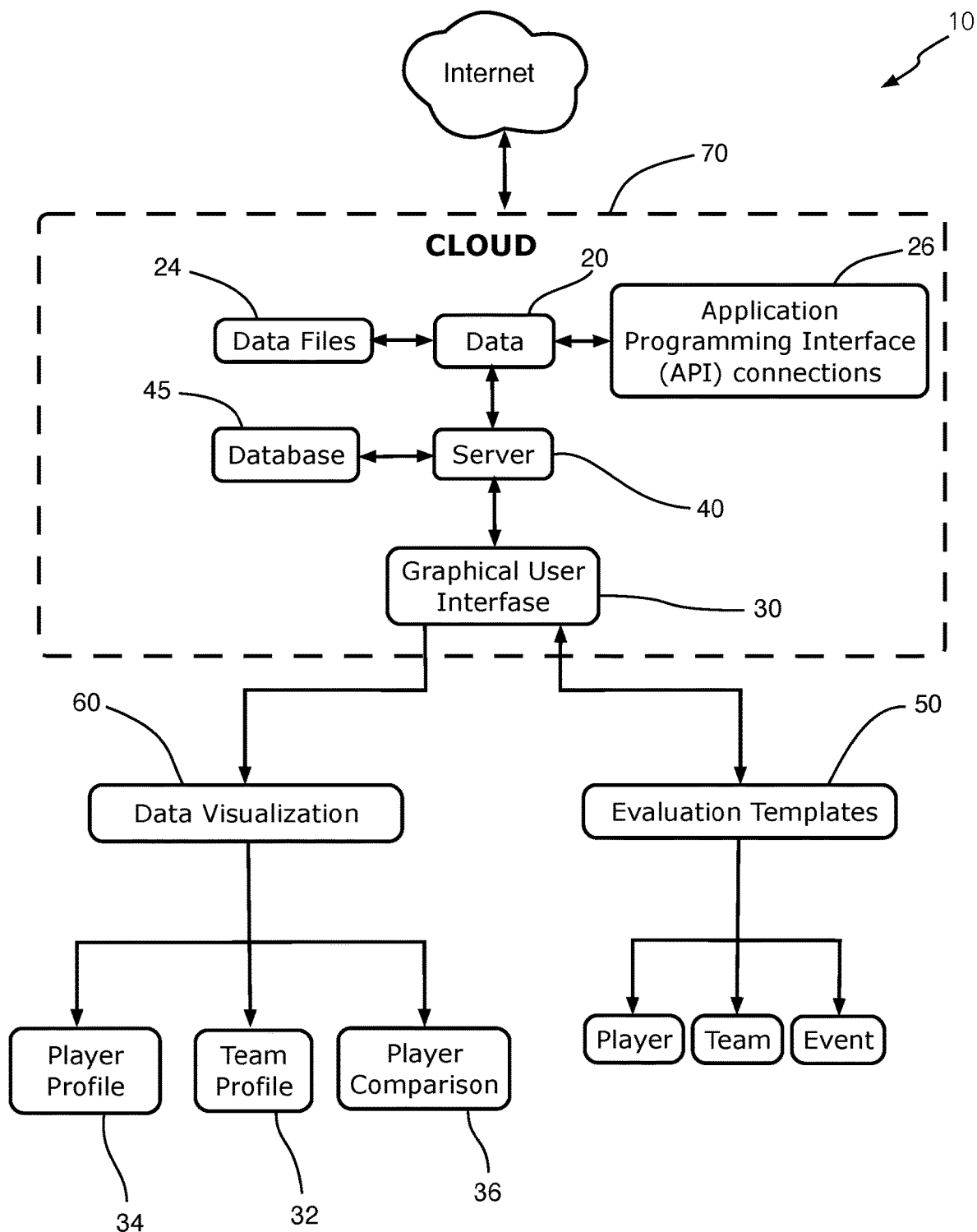
FIG. 2 is a flowchart representing the present invention.

As seen in FIGS. 1 and 2, present invention 10 allow users U to access and interpret data 20 from data files 24 collected by multiple technologies in one centralized location, and automatically transforming data 20 into usable information. Data 20 can also be pulled from Application Programming Interface connections 26. In a preferred embodiment, data 20 is related to baseball and softball performances and statistics for players and teams in games and practices.

In a first embodiment, present invention 10 is a web application that shows multiple data sources that allow users U to analyze data 20. Present invention 10 stores, visualizes, and automatically transforms data 20 captured on a web application, whereby users U analyze data 20 through visual tools, charts, and graphs.

In a second embodiment, present invention 10 transforms data 20 into automated PDF reports, referred to as evaluation templates or reports 50. Present invention 10 runs scripts that are coded in R programming language and are hosted on server 40 that pulls data from database 45 and automatically creates reports 50 that can be customized by users U or selected from existing templates.

Users U have the ability to design their own reports 50, whereby present invention 10 automates a reporting process and hosts it online, so that users U can generate their own reports 50 from data 20 that has been collected and uploaded to database 45. Present invention 10 also generates reports 50 in near real-time and post performance, so that reports 50 that are queued in a user's profile will be generated as soon as their event is over.

Present invention 10 comprises:
A) a computer program stored on a non-transitory computer readable medium;
B) cloud 70 operatively associated with the non-transitory computer readable medium;
C) server 40 operatively associated with cloud 70;
D) graphical user interface 30;
E) data 20 to input to cloud 70 from data files 24 and through Application Programming Interface (API) connections 26;
F) database 45 to store data 20, wherein the computer program allows for data visualization 60 or transforms data 20 of database 45 in evaluation templates 50; and
G) a computer device, whereby users U access graphical user interface 30 to upload data 20 for data visualization 60, connect to Application Programming Interfaces 26, and/or obtain evaluation templates 50 automatically.

Users U access graphical user interface 30 and upload data 20 through an Internet-based communication. Users U use at least one computer, tablet computer, smart phone, or means of accessing Internet in order to access to graphical user interface 30. Data 20 are in a plurality of technologies and are collected by devices having optical tracking systems, radar systems, Doppler radar systems, tracking systems, and by an accelerometer. Data 20 may be collected by devices, such as TrackMan®, FlightScope®, Rapsodo®, Yakkertech®, Blast Motion®, Hittrax®, K-Motion®, Simi®, KinaTrax®, and 4D Motion®. Data files 24 may comprise raw data 22 from basis data, results, videos, 3D App, Doppler systems, radar, and others. Users U are coaches, players, recruiters, parents, and anyone with a registered account. Users U generate evaluation templates or reports 50 from data 20 that has been collected and uploaded to database 45.

Graphical user interface 30 is a dashboard. The dashboard allows users U to analyze data 20 through visual tools, charts, and graphs. The dashboard comprises advanced filters. Evaluation templates 50 comprise reports in a computer readable format. Users U generate evaluation templates 50 from data 20 that has been collected and uploaded to database 45. Evaluation templates 50 further provide custom analysis for users U. Data 20 is collected in real time and evaluation templates 50 are generated post performance.

The data aggregation from at least one source comprise the steps of:
H) signing in the dashboard;
I) uploading data 20 into cloud 70;
J) entering session information; and
K) matching data 20 from data sources to player profiles.

Signing in the dashboard, user U easily navigates each dashboard feature. The dashboard provides data visualization 60, whereby users U access team profile 32, player profile 34, and player comparison 36. Player comparison 36 comprises reports from baseball and softball activities in games and practices, such as pitching and batting practices. Entering session information comprises entering information in fields selected from the group consisting of device type, date, and event name. Matching data 20 from data sources to a player profile consists of selecting a player's profile and identifying which data 20 from a source matches that respective player. Present invention 10 provides advanced filters to add immediate context to the data set.

Data 20 for data sources may be uploaded by team, event, or season, whereby present invention 10 provides an analysis according to the requested category. User U gets an analysis of data 20 from database 45 by categories selected from the group consisting of players, teams, events, and seasons. Users U also get from database 45 an analysis about performances of the players. For example, users U may visualize a graphical analysis about batting and pitching performance of the players in games and practices by season and event.

As seen in FIG. 3, data 20 may be raw data 22 as a document in Excel® format comprising information for each pitched ball in a game or practice. Raw data 22 comprises information about players, pitchers' throws, pitchers' team, batters, batters' side, batters' team, innings, balls, strikes, hits, home team, stadium, league, etc. In addition, raw data 22 comprises values for RelSpeed, VertRelAngle, HorzRelAngle, SpinRate, SpinAxis, VertApprAngle, HorzApprAngle, vx0, vy0, vz0, ax0, ay0, az0, and others.

Figure 4:
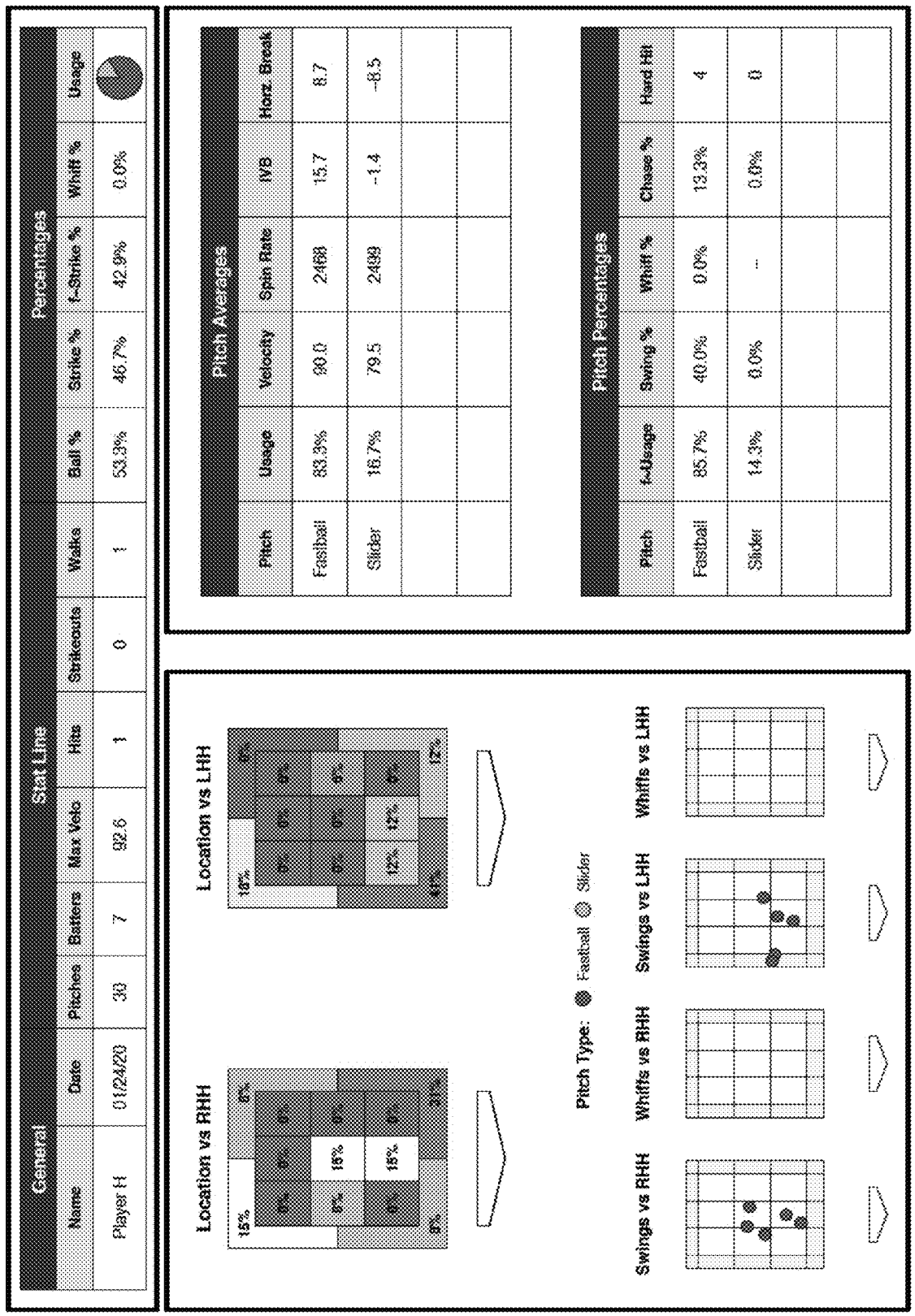
FIG. 4 is a representation of a post-game pitcher report of the present invention.
Figure 5:
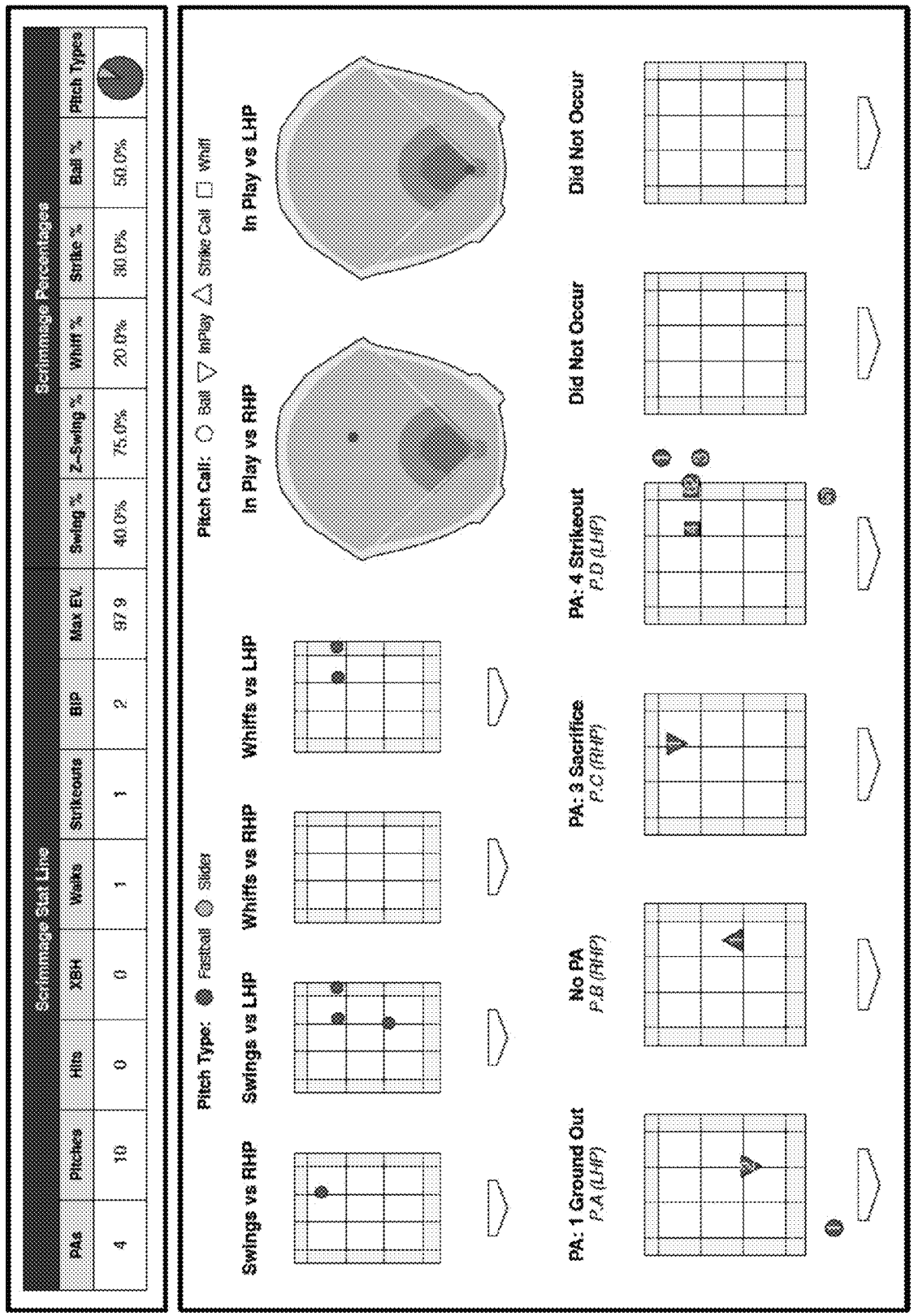
FIG. 5 is a representation of a post-game hitting report of the present invention.

As seen in FIGS. 4 and 5, present invention 10 provides automatic post game pitcher reports and post game hitting reports. User U may obtain an analysis about a performance for each player per event, game, season, etc. from raw data 22 automatically. The tables may also show any general information about the players, such as number of pitches, batters, hits, strikeouts, max speed, pitch averages, pitch percentages, as well as ball, strikes and whiff percentages.

As best seen in FIG. 4, the reports comprise graphics and tables showing an analysis of the performance of a selected player. With algorithms of present invention 10, a pitcher report may comprise information and graphics representing:

General information, a Stat Line, and Percentages for: Name, Date, Pitches, Batters, Max Velocity, Hits, Strikeouts, Walks, Ball %, Strike %, f-Strike %, Whiff %, and Usage.

With algorithms of present invention 10, Location vs. Right Hand Hitters, and Location vs. Left Hand Hitters are illustrated by percentages at an area defined as a strike zone.

With algorithms of present invention 10, pitch types are identified, as an example, fastballs and sliders.

With algorithms of present invention 10, Swings vs. Right Hand Hitters, Whiffs vs. Right Hand Hitters, Swings vs. Left Hand Hitters, and Whiffs vs. Left Hand Hitters are illustrated at an area defined as a strike zone.

With algorithms of present invention 10, Pitch Averages are tabulated for Pitch, Usage, Velocity, Spin Rate, IVB, and Horizontal Break for different pitches. As an example, fastballs and sliders.

With algorithms of present invention 10, Pitch Percentages are tabulated for Pitch, f Usage, Swing %, Whiff %, Chase %, and Hard Hit for different pitches. As an example, fastballs and sliders.

As best seen in FIG. 5, the reports comprise graphics and tables showing an analysis of the performance of a selected player. A hitting report may comprise graphics representing Swings vs RHP, Swings vs LH, Whiffs vs RHP, Whiffs vs LHP, etc. Present invention 10 comprises filters, through which user U may obtain an analysis for players by season, year, etc.

With algorithms of present invention 10, a hitter report may comprise information and graphics representing:

Scrimmage Stat Line, and Scrimmage Percentages for: Pitch Appearances, Pitches, Hits, Extra Base Hits, Walks, Strikeouts, Balls In Play, Max Exit Velocity, Swing %, Z-Swing %, Whiff %, Strike %, Ball %, and Pitch Types.

With algorithms of present invention 10, pitch types are identified, as an example, fastballs and sliders.

With algorithms of present invention 10, Swings vs. Right Hand Pitchers, Swings vs. Left Hand Pitchers, Whiffs vs. Right Hand Pitchers, Whiffs vs. Left Hand Pitchers, PA: 1 Ground Out P.A (LHP), No PA P.B (RHP), PA: 3 Sacrifice P.C (RHP), PA: 4 Strikeout P.D (LHP), and Did Not Occur are illustrated at an area defined as a strike zone.

With algorithms of present invention 10, Pitch Calls are illustrated by geometric shape corresponding to respective Balls, InPlay, Strike Calls, and Whiffs on a playing field.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for data aggregation from at least one source for use in data analysis, comprising:
    a computer program stored on a non-transitory computer readable medium; a cloud operatively associated with said non-transitory computer readable medium;
    a server operatively associated with said cloud, said server pulls data from a database and automatically creates reports that can be customized by users or selected from existing templates;
    a graphical user interface, wherein said graphical user interface is a dashboard, said users access said graphical user interface and upload said data through an Internet-based communication, said dashboard comprises advanced filters, through said dashboard said users access a team profile, a player profile, and player comparison;
        the data to input to said cloud from data files and through Application Programming Interface connections, wherein said data is from data sources collected by devices having optical tracking systems, radar systems, tracking systems, and by an accelerometer, wherein said data files comprise raw data, said raw data comprises information selected from players, pitchers' throws, pitchers' team, batters, batters' side, batters' team, innings, balls, strikes, hits, home team, stadium, and league;
        the database stores said data, wherein said computer program allows for data visualization or transforms said data of said database in evaluation templates, wherein said data is collected in real time and said evaluation templates are generated post-performance, whereby said users generate said evaluation templates from said data that has been collected and uploaded to said database, said evaluation templates comprise reports in a computer readable format, said reports are automatic post-game pitcher reports and post-game hitting reports, and further provide custom analysis for said users, session reports comprise reports from baseball and softball activities in games and practices, automatic post-game pitcher reports and post-game hitting reports; and
    a computer device whereby said users access said graphical user interface to upload said data for said data visualization, connect said Application Programming Interfaces, and/or obtain said evaluation templates automatically, wherein said users use at least one computer, tablet computer, smart phone, or means of accessing Internet in order to access said graphical user interface, said users analyze said data through visual tools, charts, and graphs with said dashboard, said users get from said database an analysis about the performance of said players, whereby an analysis of said data that is collected in real time is by categories selected from the group consisting of players, teams, and events, wherein said users get from said database an analysis about batting and pitching performance of said players in games and practices, said users are coaches, players, recruiters, parents, and anyone with a registered account;
    wherein said data aggregation from at least one source comprises the steps of: A) signing in said dashboard; B) uploading said data into said cloud; C) providing session information; and D) matching said data to a player's profile; and
    wherein said session information comprises fields selected from the group consisting of device type, date, and event name.

2. A system for data aggregation from at least one source for use in data analysis, comprising:
    a plurality of automated sports-related data sources including at least one optical tracking system, radar systems, or accelerometer, each data source generating raw performance metrics;
    a computer program stored on a non-transitory computer readable medium, said computer program including instructions for receiving, fusing, and normalizing said raw performance metrics into a unified data structure;
    a cloud computing environment operatively associated with said non-transitory computer readable medium, wherein said cloud computing environment is configured to receive said raw performance metrics from each of the plurality of automated data sources over a network and aggregate them into a centralized database;
    a database operatively associated with said cloud computing environment, said database storing the aggregated performance metrics and organizing them into relational data models that align disparate data types, ensure temporal synchronization across multiple sensor inputs, and maintain a consistent indexing scheme for comparing data sets derived from different measurement modalities; a server operatively associated to said database, said server executing said instructions of said computer program;

a graphical user interface implemented as a dashboard, accessible by users through an Internet-based communication on at least one user device, wherein said graphical user interface provides advanced filtering and visualization tools; and a computer device selected from a computer, a tablet, or a smartphone capable of accessing said graphical user interface, wherein said user upload said data sources, connect Application Programming Interfaces for automatic data ingestion, and retrieve integrated said evaluation templates or performance reports, wherein said data files comprise a raw data, unprocessed sensor outputs originating directly from said plurality of automated sports-related data sources, including at least one of optical image frames, radar velocity measurements, biomechanical sensor signals, or force plate readings, wherein said computer program is configured to ingest said raw data files and apply data normalization, synchronization, and unit conversion processes to yield integrated and comparable performance metrics, said users comprise one or more of coaches, players, recruiters, parents, or other registered account holders, wherein said graphical user interface and said evaluation templates are dynamically adapted based on user roles.

* * * * *